United States Patent
Capoldi et al.

(10) Patent No.: US 9,004,776 B2
(45) Date of Patent: Apr. 14, 2015

(54) ROLLING BEARING ASSEMBLY

(71) Applicants: Bruno Capoldi, Charentenay (FR);
Juliette Delaby, Charentenay (FR);
Michel Nicolas, Annay La Côte (FR)

(72) Inventors: Bruno Capoldi, Charentenay (FR);
Juliette Delaby, Charentenay (FR);
Michel Nicolas, Annay La Côte (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/489,599

(22) Filed: Sep. 18, 2014

(65) Prior Publication Data
US 2015/0078698 A1     Mar. 19, 2015

(30) Foreign Application Priority Data
Sep. 18, 2013    (EP) .................................... 13184998

(51) Int. Cl.
*F16C 33/58*  (2006.01)
*F16C 19/26*  (2006.01)
*F16C 27/04*  (2006.01)

(52) U.S. Cl.
CPC ............... *F16C 33/585* (2013.01); *F16C 19/26* (2013.01); *F16C 27/04* (2013.01); *Y10S 384/906* (2013.01)

(58) Field of Classification Search
USPC .......... 384/611, 615, 620, 622, 452–455, 906
See application file for complete search history.

(56) References Cited

U.S. PATENT DOCUMENTS

| | | | | |
|---|---|---|---|---|
| 2,530,323 A | * | 11/1950 | Boyd | 384/611 |
| 2,673,768 A | * | 3/1954 | Forest | 384/615 |
| 3,068,052 A | * | 12/1962 | Foster | 384/611 |
| 4,166,659 A | * | 9/1979 | Gleichman | 384/620 |
| 4,906,112 A | * | 3/1990 | Gobel et al. | 384/622 |
| 5,433,536 A | * | 7/1995 | Bergling | 384/620 |

* cited by examiner

*Primary Examiner* — Thomas R Hannon
(74) *Attorney, Agent, or Firm* — Bryan Peckjian; SKF USA Inc. Patent Dept.

(57) ABSTRACT

A rolling bearing assembly having a rotatable element that rotates with respect to a non-rotatable element around a central rotation axis is provided. The assembly includes rolling systems disposed between the rotatable and non-rotatable elements, the rolling systems having at least one rolling system providing rolling elements arranged along radial axes with respect to the rotation axis. The assembly has at least one elastic ring forming a raceway track mounted on the non-rotatable element so that the rolling elements cooperate with the elastic ring, the elastic ring in contact with the rolling elements by resilient elements mounted in holes distributed around the circumference of the non-rotatable element. The assembly has at least one blocking member mounted in the non rotatable element that protrudes in a hole of the elastic ring, the blocking member blocks the elastic ring from rotating around the central rotation axis with respect to the non-rotatable element.

11 Claims, 6 Drawing Sheets

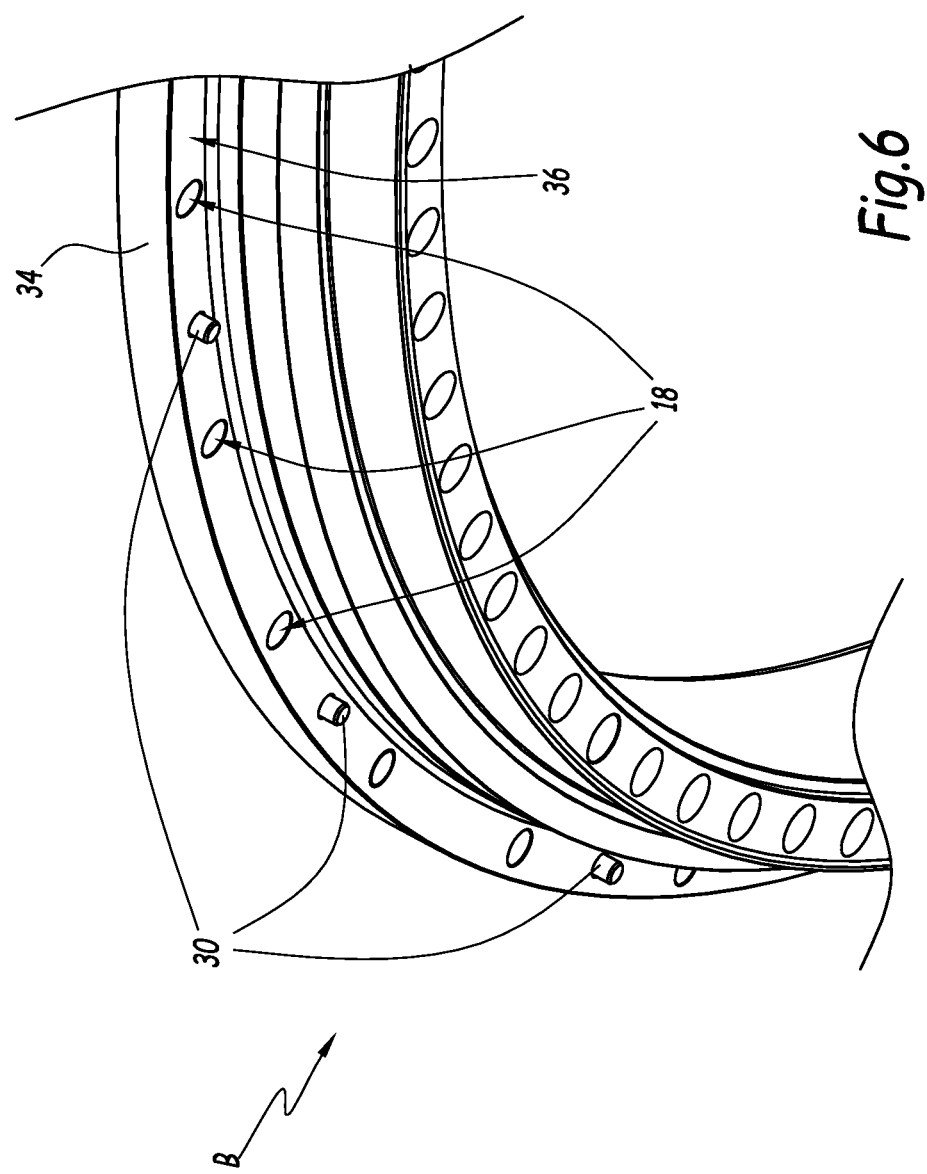

ROLLING BEARING ASSEMBLY

CROSS-REFERENCE TO RELATED APPLICATIONS

This application claims priority to European Patent Application No. EP13184998 filed Sep. 18, 2013, which is herein fully incorporated by reference.

FIELD OF THE INVENTION

The invention concerns a rolling bearing assembly and a method for manufacturing such a rolling bearing assembly.

BACKGROUND OF THE INVENTION

Rolling bearing assemblies for tunnel boring machines, oil extraction installations or marine applications usually include roller bearings which cooperate with an elastic ring forming a raceway track urged against the rollers by spring systems to cancel an axial clearance which exists in the rolling bearing assembly. Such a system is known from US-A-2010/0316322.

However, the spring systems do not prevent the elastic ring from rotating with respect to its housing. Such a rotation of the elastic ring with respect to a static ring provokes wear on the elastic ring, which can harm its efficiency.

SUMMARY OF THE INVENTION

The aim of the invention is to provide a new rolling bearing assembly which prevents the elastic ring from rotating with respect to its housing.

To this end, the invention concerns a rolling bearing assembly comprising a rotatable element adapted to rotate with respect to a non-rotatable element around a central rotation axis, and rolling systems arranged between the rotatable element and the non-rotatable element, rolling systems comprising at least one rolling system having rolling elements arranged along radial axes with respect to the rotation axis of the rolling bearing assembly, the rolling bearing assembly comprising at least one elastic ring forming a raceway track mounted on the non rotatable element so that the rolling elements cooperate with the elastic ring, the elastic ring being kept in contact with the rolling elements by several resilient elements mounted in holes distributed around the circumference of the non rotatable element. The rolling bearing assembly is characterized in that it comprises at least one blocking member mounted in the non rotatable element and which protrudes in a hole of the elastic ring, so that the blocking member blocks the elastic ring in rotation around the central rotation axis with respect to the non-rotatable element.

Thanks to the invention, the elastic ring is held in place with respect to is housing. No rotation can occur between the housing and the elastic ring, and wear on the elastic ring is therefore avoided.

According to further aspects of the invention which are advantageous but not compulsory, such a rolling bearing assembly may incorporate one or several of the following features:

- The rolling bearing assembly comprises several blocking members distributed around the circumference of the non-rotatable element.
- The blocking members are regularly distributed around the central rotation axis except one.
- The number of blocking members is half the number of resilient elements.
- The blocking member is a cylindrical pin which extends parallely to the rotation axis of the rolling bearing assembly.
- The pin is made of steel.
- The hole of the elastic ring has a diameter slightly superior to the diameter of the blocking member.
- The ratio between the diameter of the blocking member and the diameter of the hole of the elastic ring is comprised between 0.83 and 0.99.
- The blocking member is mounted in a through hole provided through a radial portion of the non rotatable element.
- The hole of the elastic ring has a depth slightly superior to the protruding length of the blocking member.
- The ratio between the protruding length of the blocking member and the depth of the elastic ring is comprised between 0.71 and 0.99.

The invention also concerns a method for manufacturing a rolling bearing assembly as mentioned here-above, characterized in that it comprises a step consisting in drilling the hole of the elastic ring through the hole of the radial portion of the non-rotatable element.

BRIEF DESCRIPTION OF THE DRAWINGS

The invention will now be explained in correspondence with the annexed figures, as an illustrative example. In the annexed figures:

FIG. 6 is a perspective view along arrow VI on FIG. 3, of a non rotatable element of the rolling bearing assembly of FIGS. 1 to 5.

DETAILED DESCRIPTION OF THE INVENTION

Figure 1:
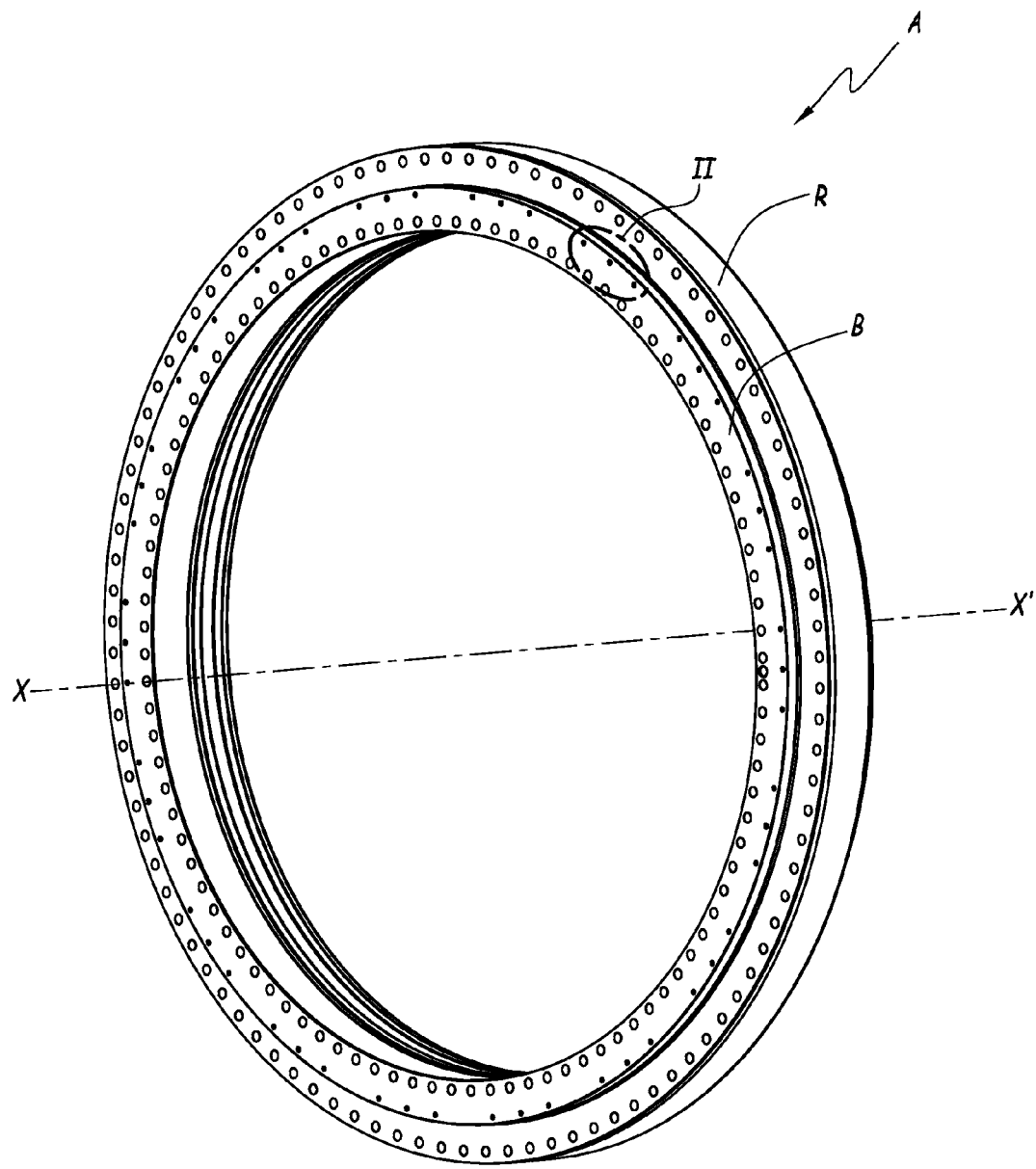
FIG. 1 is a perspective view of a rolling bearing assembly according to the invention.
Figure 2:
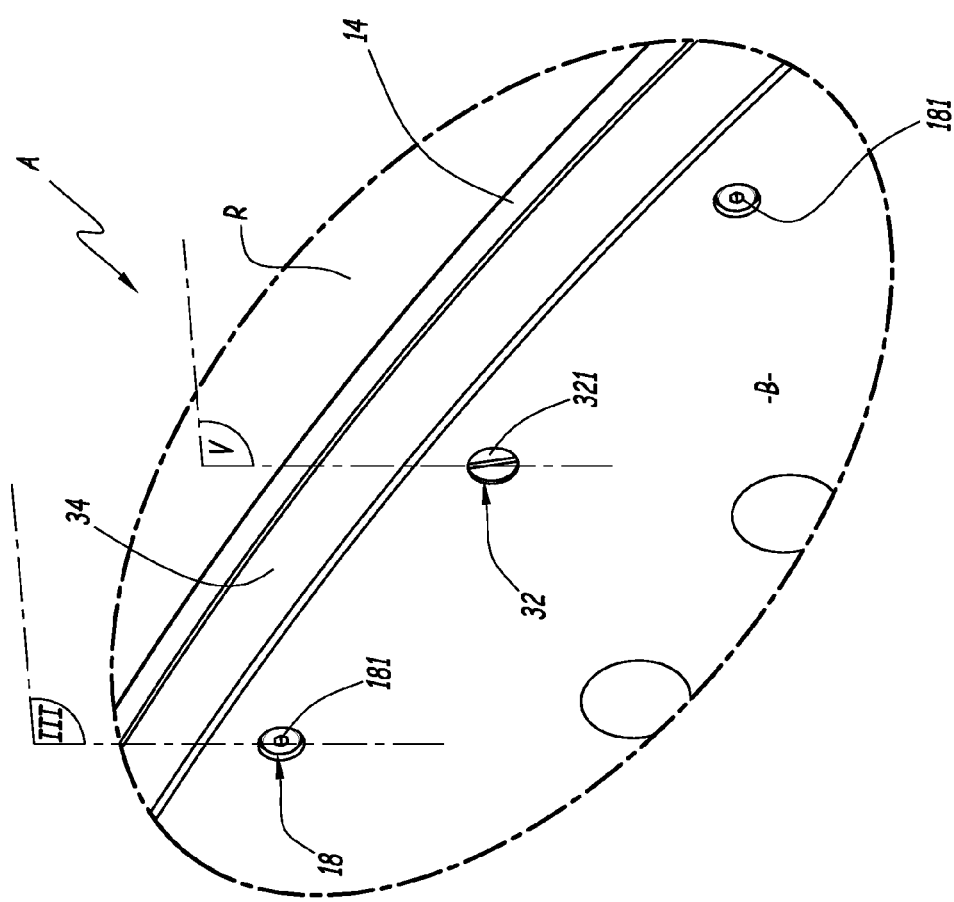
FIG. 2 is a view at a larger scale of detail II on FIG. 1.
Figure 3:
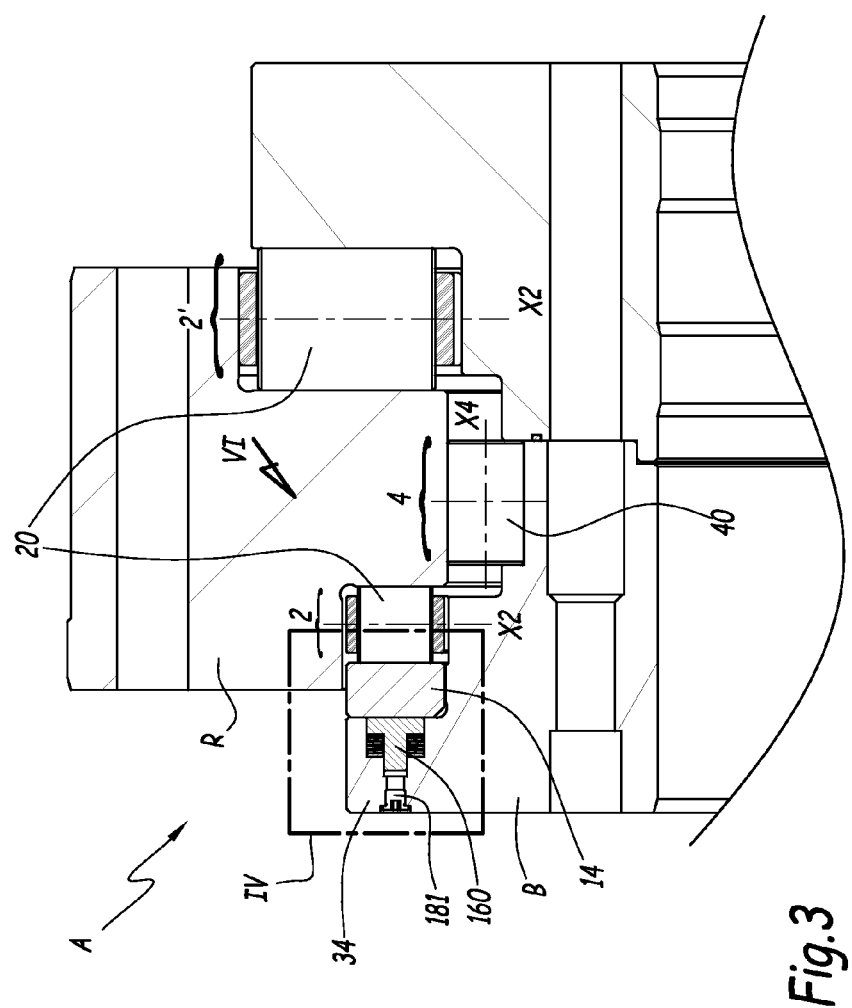
FIG. 3 is a partial sectional view along plane III-III on FIG. 2.
Figure 4:
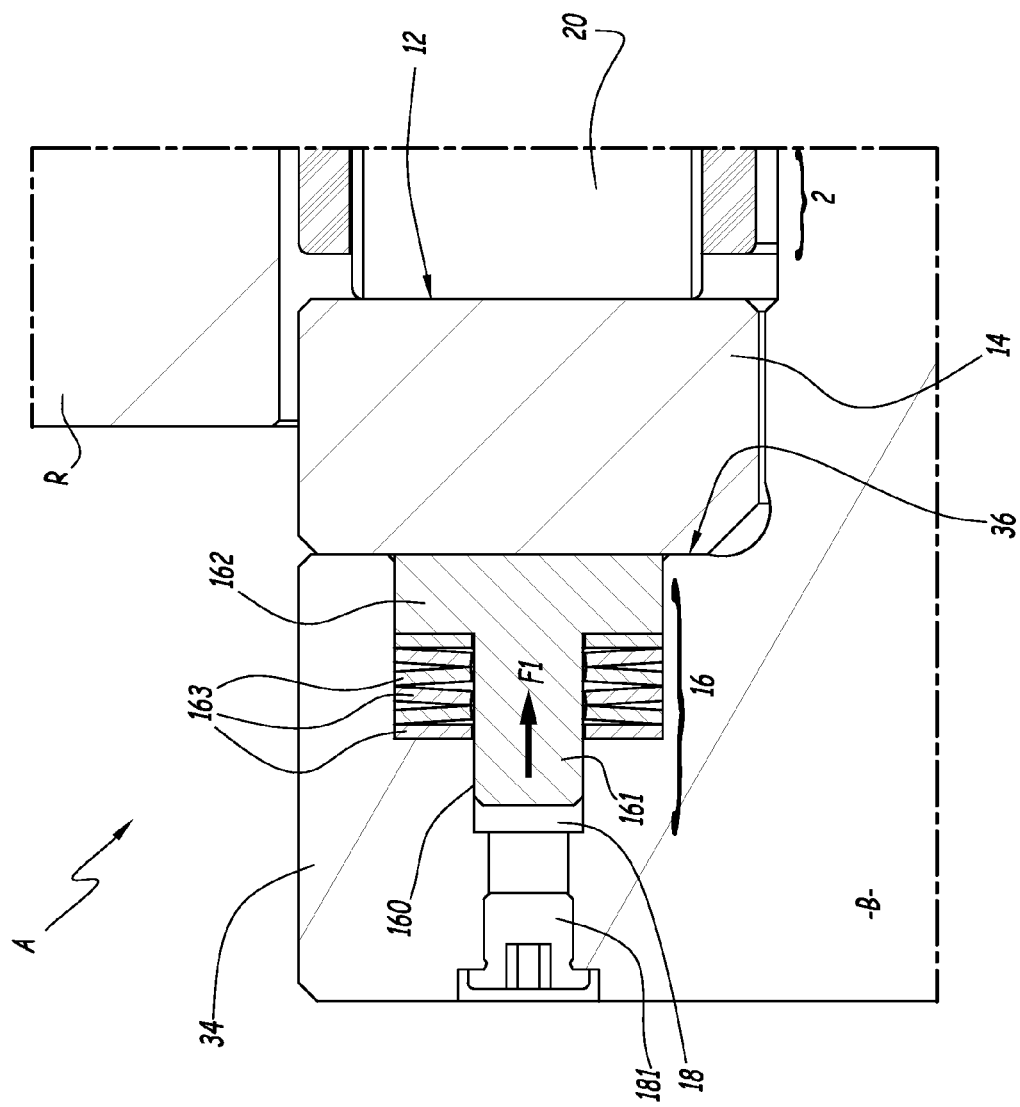
FIG. 4 is a view, at a larger scale, of detail IV on FIG. 3.
Figure 5:
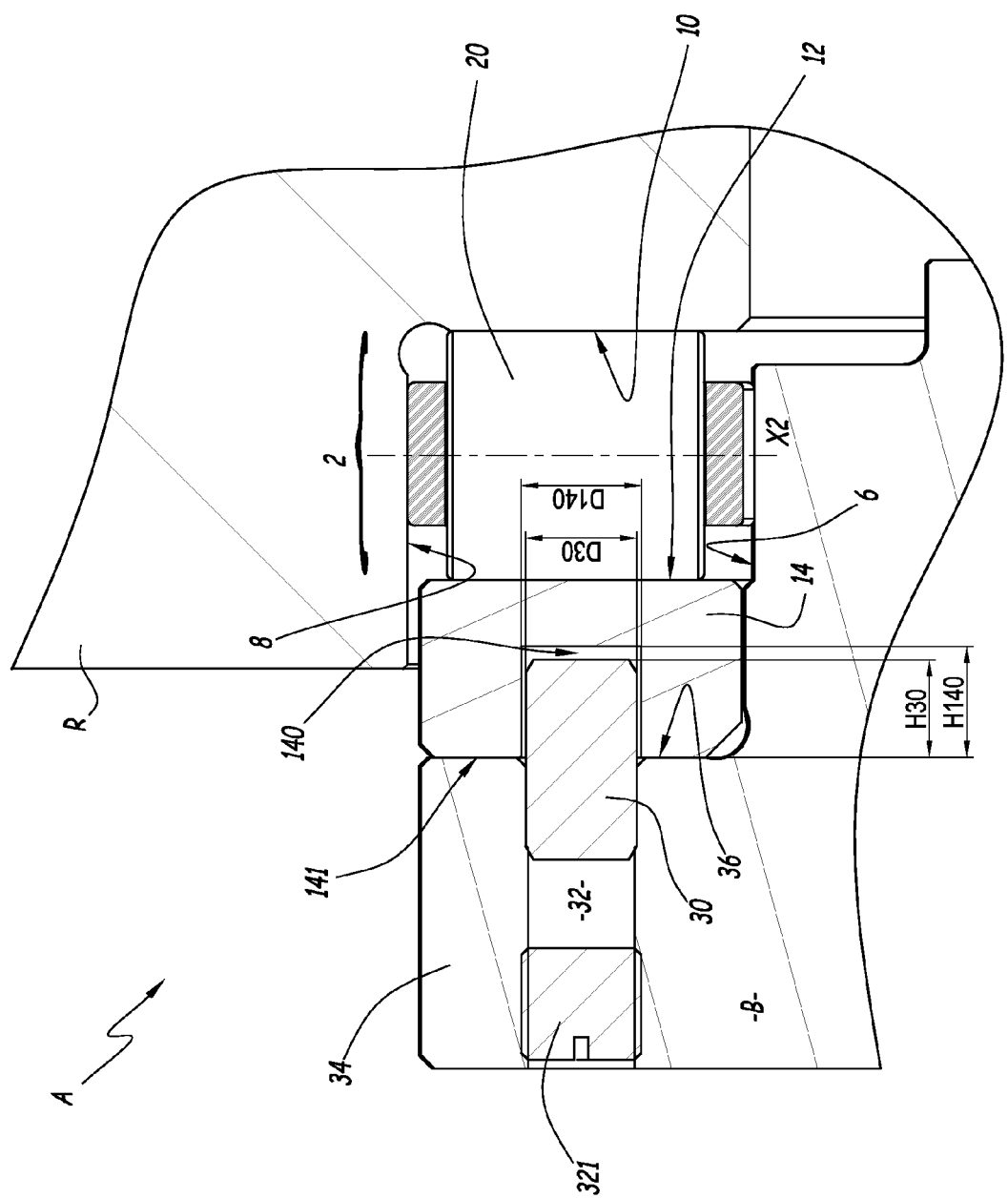
FIG. 5 is a partial sectional view along plane V-V, on FIG. 2.

A rolling bearing assembly A is represented on FIGS. 1 to 6. Rolling bearing assembly A comprises a rotatable element R and a fixed element or base B. Rotatable element R rotates with respect to fixed element B around a central axis X-X' represented on FIG. 1.

Rolling bearing assembly A also comprises rolling bearings which permit the rotation of rotatable element R with respect to non rotatable element B. These rolling bearings comprise two radial roller bearings, respectively a first bearing 2 and a second bearing 2', comprising rollers 20 which have a rotation axis X2 perpendicular to axis X-X', and one axial roller bearing 4, comprising rollers 40 which have a rotation axis X4 parallel to axis X-X'.

According to a non-shown embodiment of the invention, rolling bearing assembly A may comprise other types of bearing systems, such as ball bearings or needle bearings.

First radial roller bearing 2 is mounted between a radial cylindrical surface 6 of fixed element B and a radial cylindrical surface 8 of rotatable element R. First radial roller bearing 2 comprises rollers 20 which cooperate, on a first side, with an axial annular surface 10 of rotatable element R, and an axial surface 12 of fixed element B, which is provided on an elastic ring 14 which forms an annular raceway track. Elastic ring 14 is pushed against rollers 20 by several resilient elements formed by spring systems 16. Each spring system 16 comprises a pushing member 160 housed in a bore 18 of fixed element B. Pushing members 160 each comprise a rod 161 and a piston 162. Spring washers 163 are mounted around rod 161 and exert an elastic force which urges piston 162 against elastic ring 14, as represented by arrow F1 on FIG. 4. The force exerted by spring systems 16 permits to cancel an axial clearance which exists in rolling bearing assembly A. Bores 18 are closed by shutters 181 screwed in bores 18 on their opposite side with respect to elastic ring 14.

To prevent relative rotation between elastic ring 14 and non rotatable element B, rolling bearing assembly A comprises at least one blocking member mounted in fixed element B and which protrudes in a hole of elastic ring 14 so that the blocking member blocks in rotation elastic ring 14 with respect to non-rotatable element B.

In the represented embodiment, the blocking member is a pin 30 mounted in a bore 32 of non rotatable element B and which extends parallel to rotation axis X-X'. Pin 30 protrudes from an axial inner annular surface 36 of non rotatable element B in a hole 140 of elastic ring 14, which is realized on a surface 141 of elastic ring 14 opposed to bore 32.

Thanks to pin 30, relative rotation between elastic ring 14 and non rotatable element B is avoided, preventing wear from occurring on elastic ring 14 due to friction against pushing members 160 and non rotatable element B.

As represented on FIG. 6, rolling bearing assembly A preferably comprises several pins 30 distributed around the circumference of elastic ring 14. More preferably, pins 30 are equally angularly spaced with respect to each other except one, in order to provide a means to mount elastic ring 14 in its correct angular position.

The number of pins 30 is preferably half the number of spring systems 16. In other words, every pin 30 is separated angularly from each other by two spring systems 16.

Pins 30 are preferably made of a metallic material such as steel.

Bores 32 in which pins 30 are mounted are preferably through holes realized through a radial portion 34 of fixed element B. This provides a simple means to realize holes 140 in elastic ring 14, as an optional aspect, by positioning elastic ring 14 against axial surface 36 and then drilling holes 140 at the right places through bores 32. Bores 32 are closed by shutters 321 screwed in bores 32 on their opposite side with respect to elastic ring 14.

Holes 140 of elastic ring 14 have a diameter D140 slightly superior to the diameter D30 of pin 30. The ratio between diameter D30 and diameter D140 is preferably comprised between 0.83 and 0.99. This permits to keep a substantial radial clearance between holes 140 and pins 30 in order to facilitate the assembly of elastic ring 14.

Holes 140 have a depth H140 slightly superior to the protruding length H30 of pins 30. The ratio between length H30 and depth H140 is preferably comprised between 0.71 and 0.99. This avoids a preloading of elastic ring 14 under action of pins 30, which could slow down the rotation of rolling bearing assembly A. Moreover, elastic ring 14 is already preloaded by spring systems 16.

In a preferred but not limiting embodiment of the invention, D30=25 mm, D140=27 mm, H30=22 mm and H140=25 mm. Therefore the ration between D30 and D140 is equal to 0.92 and the ratio between H30 and H140 is equal to 0.88.

According to a non-shown embodiment of the invention, rolling bearing assembly A can also comprise a second elastic ring adapted to cooperate with the rolling elements of rolling bearing 2', involving spring systems and blocking members similar to the ones described for rolling bearing 2.

The invention claimed is:

1. A rolling bearing assembly comprising:
   a rotatable element adapted to rotate with respect to a non-rotatable element around a central rotation axis,
   rolling systems arranged between the rotatable element and the non-rotatable element, the rolling systems providing at least one rolling system having rolling elements arranged along radial axes with respect to the rotation axis of the rolling bearing assembly,
   at least one elastic ring forming a raceway track mounted on the non-rotatable element so that the rolling elements cooperate with the elastic ring, the elastic ring being kept in contact with the rolling elements by several resilient elements mounted in holes distributed around the circumference of the non-rotatable element, wherein
   the rolling bearing assembly includes at least one blocking member mounted in the non-rotatable element that protrudes in a hole of the elastic ring, so that the blocking member blocks the elastic ring from rotating around the central rotation axis with respect to the non-rotatable element.

2. The rolling bearing assembly according to claim 1, further comprising a plurality of blocking members distributed around the circumference of the non-rotatable element.

3. The rolling bearing assembly according to claim 2, wherein the blocking members are regularly distributed around the central rotation axis except for one.

4. The rolling bearing assembly according to claim 3, wherein the number of blocking members is half the number of resilient elements.

5. The rolling bearing assembly according to claim 4, wherein the blocking member is a cylindrical pin which extends parallel to the rotation axis of the rolling bearing assembly.

6. The rolling bearing assembly according to claim 5, wherein the pin is made of steel.

7. The rolling bearing assembly according to claim 6, wherein the hole of the elastic ring has a diameter slightly superior to the diameter of the blocking member.

8. The rolling bearing assembly according to claim 7, wherein the ratio between the diameter of the blocking member and the diameter of the hole of the elastic ring is between 0.83 and 0.99.

9. The rolling bearing assembly according to claim 8, wherein the blocking member is mounted in a through hole provided through a radial portion of the non-rotatable element.

10. The rolling bearing assembly according to claim 9, wherein the hole of the elastic ring has a depth slightly superior to the protruding length of the blocking member.

11. The rolling bearing assembly according to claim 10, wherein the ratio between the protruding length of the blocking member and the depth of the elastic ring is between 0.71 and 0.99.

* * * * *